(12) United States Patent
Ruth et al.

(10) Patent No.: US 7,680,586 B2
(45) Date of Patent: Mar. 16, 2010

(54) MASS AIR FLOW SENSOR SIGNAL COMPENSATION SYSTEM

(75) Inventors: Michael J. Ruth, Franklin, IN (US); Stewart D. Sullivan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 265 days.

(21) Appl. No.: 11/957,875

(22) Filed: Dec. 17, 2007

(65) Prior Publication Data

US 2008/0148811 A1   Jun. 26, 2008

Related U.S. Application Data

(60) Provisional application No. 60/871,059, filed on Dec. 20, 2006.

(51) Int. Cl.
   *F02D 41/18* (2006.01)
(52) U.S. Cl. ............ 701/109; 73/114.34; 123/674; 123/681
(58) Field of Classification Search .......... 701/103, 701/109; 73/114.32, 114.34; 123/674, 681, 123/683
   See application file for complete search history.

(56) References Cited

U.S. PATENT DOCUMENTS

| | | | |
|---|---|---|---|
| 5,070,846 A * | 12/1991 | Dudek et al. ............ 123/488 |
| 6,112,729 A | 9/2000 | Barnes et al. | |
| 6,227,033 B1 | 5/2001 | Kainz | |
| 6,236,908 B1 | 5/2001 | Cheng et al. | |
| 6,311,679 B1 | 11/2001 | Druzhinina et al. | |
| 6,604,412 B2 | 8/2003 | Jankovic et al. | |
| 6,636,796 B2 | 10/2003 | Kolmanovsky et al. | |
| 6,718,822 B2 | 4/2004 | Soliman et al. | |
| 6,883,318 B2 * | 4/2005 | Warner et al. ........... 60/602 |
| 6,997,162 B2 | 2/2006 | Hirayama et al. | |
| 7,302,335 B1 * | 11/2007 | Xiao et al. ............ 701/103 |
| 2004/0030279 A1 | 2/2004 | Rubenstein et al. | |

FOREIGN PATENT DOCUMENTS

EP   0892165   1/1999

OTHER PUBLICATIONS

PCT Search Report dated Apr. 16, 2008 cited in counterpart foreign application PCT/US 07/87956.
PCT Written Opinion dated Apr. 16, 2008 cited in counterpart foreign application PCT/US 07/87956.

* cited by examiner

*Primary Examiner*—Erick Solis
(74) *Attorney, Agent, or Firm*—Barnes & Thornburg LLP; J. Bruce Schelkopf (57) ABSTRACT

A method and system are disclosed for compensating a mass air flow signal produced by a mass air flow sensor in fluid communication with an air intake passageway of an internal combustion engine. A mass air flow signal produced by the mass air flow sensor is monitored and an expected oxygen concentration of exhaust gas produced by the engine is determined. A compensation parameter is determined as a function of the expected oxygen concentration and a measured value of the oxygen concentration of the exhaust gas. A compensated mass air flow value is determined as a function of the mass air flow signal and the compensation parameter.

25 Claims, 5 Drawing Sheets

MASS AIR FLOW SENSOR SIGNAL COMPENSATION SYSTEM

CROSS-REFERENCE TO RELATED APPLICATION

This application claims the benefit of, and priority to, U.S. Provisional Patent Application Ser. No. 60/871,059, filed Dec. 20, 2006, the disclosure of which is incorporated herein by reference.

FIELD OF THE INVENTION

The present invention relates generally to mass air flow sensors of the type typically implemented in systems for controlling the operation of internal combustion engines, and more specifically to techniques for compensating for variations in mass air flow signals produced by such sensors.

BACKGROUND

It is known that mass air flow signals produced by conventional mass air flow sensors may drift over time so that the corresponding mass air flow values computed from the mass air flow signals may become increasingly inaccurate. It is therefore desirable to compensate for variations of the mass air flow signals produced by conventional mass air flow sensors.

SUMMARY

The present invention may comprise one or more of the features recited in the attached claims, and/or one or more of the following features and combinations thereof. A mass air flow sensor signal compensation system comprises an engine speed sensor configured to produce an engine speed signal indicative of rotational speed of an internal combustion engine, an oxygen sensor configured to produce an oxygen signal indicative of oxygen concentration of exhaust gas produced by the engine, a mass air flow sensor configured to produce a mass air flow signal indicative of a flow rate of fresh air into the engine, and a control circuit. The control circuit may include a memory having stored therein instructions that are executable by the control circuit to determine an expected oxygen concentration of the exhaust gas as a function of the engine speed signal and a fuel flow value corresponding to a rate of fuel supplied to a fueling system of the engine, to determine a compensation parameter as a function of the expected oxygen concentration and the oxygen signal and to determine a compensated mass air flow value as a function of the mass air flow signal and the compensation parameter.

The system may further comprise at least one actuator responsive to an actuator control signal to control operation of at least one of the engine and an air handling system coupled to the engine. The control circuit may be configured to produce the at least one actuator control signal based at least in part on the compensated mass air flow value.

The instructions may further comprise instructions that are executable by the control circuit to determine the compensated mass air flow value by mapping an instantaneous value of the mass air flow signal to a corresponding correction value, updating the correction value as a function of the correction value and the compensation parameter, determining a compensated mass air flow signal based on the mass air flow signal and the updated correction value and mapping the compensated air flow signal to the compensated mass air flow value. The instructions may further comprise instructions that are executable by the control circuit to update the correction value by modifying the correction value by a fraction of the compensation parameter. The instructions may further comprise instructions that are executable by the control circuit to store the updated correction value in a map that maps the instantaneous value of the mass air flow signal to the corresponding correction value.

Alternatively, the instructions may further comprise instructions that are executable by the control circuit to determine the compensated mass air flow value by mapping an instantaneous value of the mass air flow signal to a corresponding compensated mass air flow value and updating the corresponding compensated mass air flow value as a function of the corresponding compensated mass air flow value and the compensation parameter. The instructions may further comprise instructions that are executable by the control circuit to update the corresponding compensated mass air flow value by modifying the corresponding compensated mass air flow value by a fraction of the compensation parameter. The instructions may further comprise instructions that are executable by the control circuit to store the updated corresponding compensated mass air flow value in a map that maps the instantaneous value of the mass air flow signal to the corresponding compensated mass air flow value.

A method of compensating a mass air flow signal produced by a mass air flow sensor in fluid communication with an air intake passageway of an internal combustion engine may comprise monitoring an oxygen signal produced by an oxygen sensor and indicative of an oxygen content of exhaust gas produced by the engine, determining an expected oxygen concentration of exhaust gas produced by the engine, determining a compensation parameter as a function as a function of the oxygen signal and the expected oxygen concentration, and determining a compensated mass air flow value as a function of the mass air flow signal and the compensation parameter.

The method may further comprise controlling an actuator that controls operation of at least one of the engine and an air handling system coupled to the engine as a function of the compensated mass air flow value.

Determining the compensated mass air flow value may comprise mapping an instantaneous value of the mass air flow signal to a corresponding correction value, updating the correction value as a function of the correction value and the compensation parameter, determining a compensated mass air flow signal based on the mass air flow signal and the updated correction value, and mapping the compensated air flow signal to the compensated mass air flow value. Updating the correction value may comprise modifying the correction value by a fraction of the compensation parameter. The method may further comprise storing the updated correction value in a map that maps the instantaneous value of the mass air flow signal to the corresponding correction value. The method may further comprise controlling an actuator that controls operation of at least one of the engine and an air handling system coupled to the engine as a function of the compensated mass air flow value.

Alternatively, determining the compensated mass air flow value may comprise mapping an instantaneous value of the mass air flow signal to a corresponding compensated mass air flow value, and updating the corresponding compensated mass air flow value as a function of the corresponding compensated mass air flow value and the compensation parameter. Updating the corresponding compensated mass air flow value may comprise modifying the corresponding compensated mass air flow value by a fraction of the compensation parameter. The method may further comprise storing the updated corresponding compensated mass air flow value in a map that maps the instantaneous value of the mass air flow signal to the corresponding compensated mass air flow value. The method may further comprise controlling an actuator that controls operation of at least one of the engine and an air handling system coupled to the engine as a function of the compensated mass air flow value.

Determining an expected oxygen concentration of exhaust gas produced by the engine may comprises monitoring an engine speed signal produced by an engine speed sensor and indicative of rotational speed of the engine, monitoring a rate of fuel supplied a fuel system of the engine, and determining the expected oxygen concentration as a function of instantaneous values of the engine speed signal and the rate of fuel supplied to the engine.

A method of compensating a mass air flow signal produced by a mass air flow sensor in fluid communication with an air intake passageway of an internal combustion engine may comprise monitoring the mass air flow signal produced by the mass air flow sensor, determining an expected oxygen concentration of exhaust gas produced by the engine, determining a compensation parameter as a function of the expected oxygen concentration and a measured value of the oxygen concentration of the exhaust gas, and determining a compensated mass air flow value as a function of the mass air flow signal and the compensation parameter.

The method may further comprise controlling an actuator that controls operation of at least one of the engine and an air handling system coupled to the engine as a function of the compensated mass air flow value.

Determining the compensated mass air flow value may comprise mapping an instantaneous value of the mass air flow signal to a corresponding correction value, updating the correction value as a function of the correction value and the compensation parameter, determining a compensated mass air flow signal based on the mass air flow signal and the updated correction value, and mapping the compensated air flow signal to the compensated mass air flow value. Updating the correction value comprises modifying the correction value by a fraction of the compensation parameter. The method may further comprise storing the updated correction value in a map that maps the instantaneous value of the mass air flow signal to the corresponding correction value. The method may further comprise controlling an actuator that controls operation of at least one of the engine and an air handling system coupled to the engine as a function of the compensated mass air flow value.

Alternatively, determining the compensated mass air flow value may comprise mapping an instantaneous value of the mass air flow signal to a corresponding compensated mass air flow value, and updating the corresponding compensated mass air flow value as a function of the corresponding compensated mass air flow value and the compensation parameter. Updating the corresponding compensated mass air flow value comprises modifying the corresponding compensated mass air flow value by a fraction of the compensation parameter. The method may further comprise storing the updated corresponding compensated mass air flow value in a map that maps the instantaneous value of the mass air flow signal to the corresponding compensated mass air flow value. The method may further comprise controlling an actuator that controls operation of at least one of the engine and an air handling system coupled to the engine as a function of the compensated mass air flow value.

Determining the compensation parameter may comprises monitoring an oxygen signal produced by an oxygen sensor and indicative of the oxygen content of the exhaust gas produced by the engine, and determining the compensation parameter as a function of the expected oxygen concentration and the measured value of the oxygen concentration in the form of an instantaneous value of the oxygen signal.

Determining an expected oxygen concentration of exhaust gas produced by the engine may comprise monitoring an engine speed signal produced by an engine speed sensor and indicative of rotational speed of the engine, monitoring a rate of fuel supplied a fuel system of the engine, and determining the expected oxygen concentration as a function of instantaneous values of the engine speed signal and the rate of fuel supplied to the engine.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
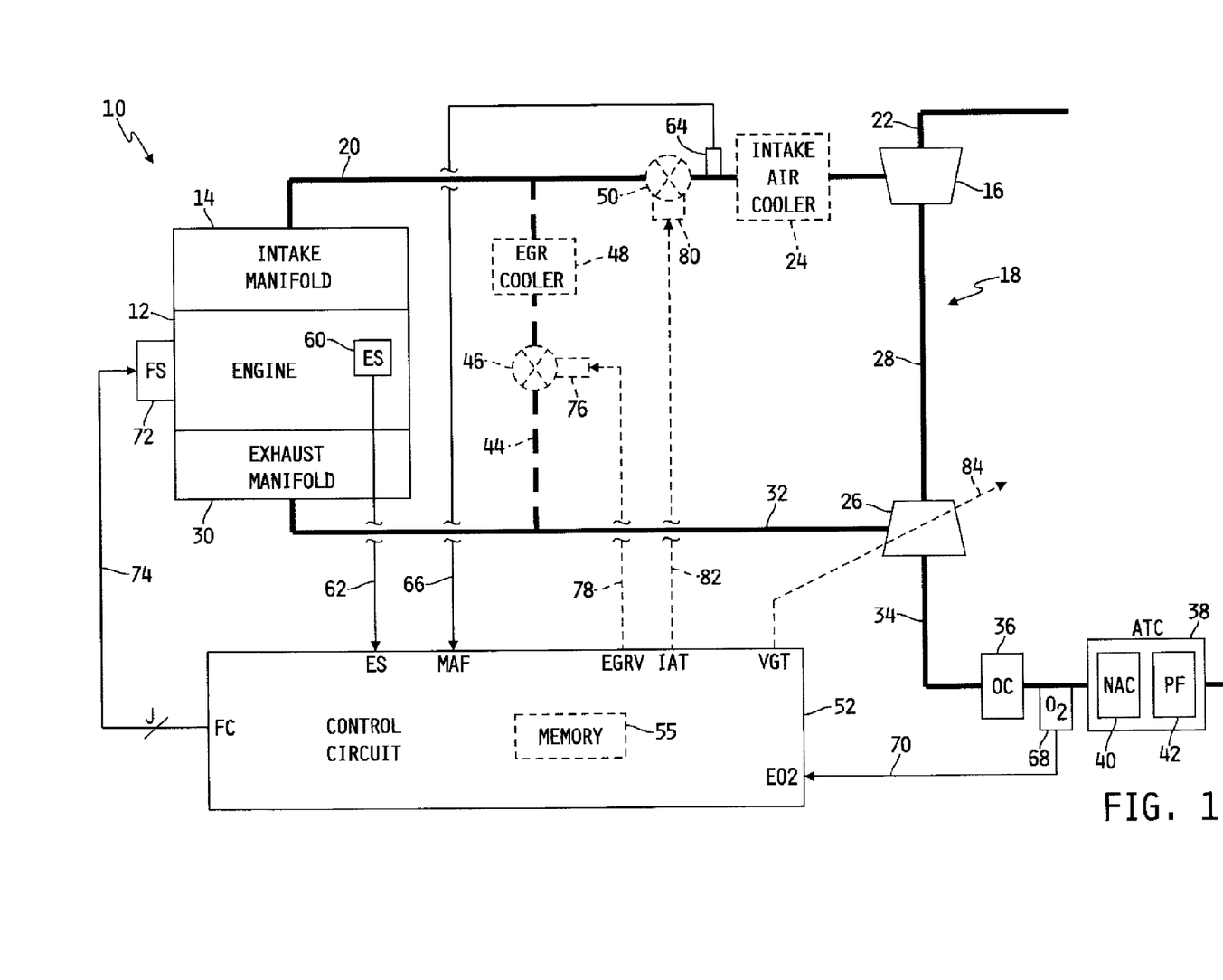
FIG. 1 is a diagram of one illustrative embodiment of a mass air flow sensor compensation system.

Referring now to FIG. 1, one illustrative embodiment of a mass air flow sensor signal compensation system 10 is shown. In the illustrated embodiment, the system 10 includes an internal combustion engine 12 having an intake manifold 14 fluidly coupled to a fresh air outlet of a compressor 16 of a turbocharger 18 via a conduit 20. A fresh air inlet of the compressor 16 is fluidly coupled to a fresh air intake conduit 22. An intake air cooler 24 may optionally be disposed in-line with the intake air conduit 20 adjacent to the fresh air outlet of the compressor 16 to cool the fresh air supplied by the compressor 16 as shown by dashed-line representation in FIG. 1. A turbine 26 of the turbocharger 18 is mechanically coupled via a rotational drive shaft 28 to the compressor 16 in a conventional manner. An exhaust gas inlet of the turbine 26 is fluidly coupled to an exhaust manifold 30 of the engine 12 via an exhaust gas conduit 32. An exhaust gas outlet of the turbine 26 is fluidly coupled to an exhaust gas inlet of an oxidation catalyst (OC) 36 via an exhaust gas conduit 34. The oxidation catalyst 36 includes a conventional catalyst element responsive to hydrocarbons introduced into the exhaust gas stream to elevate the temperature of the exhaust gas to a temperature suitable for regeneration of one or more downstream exhaust gas aftertreatment components. An example of one such downstream aftertreatment component 38 illustrated in FIG. 1, and is disposed in-line with the exhaust gas conduit 34 between the OC 36 and ambient. In the illustrated embodiment, the exhaust gas aftertreatment component (ATC) 38 includes a conventional NOx adsorber catalyst (NAC) 40 followed by a downstream conventional particulate filter (PF) 42. For purposes of this document, the exhaust aftertreatment component 38 may include more or fewer component elements in any desired order relative to the direction of exhaust gas flow.

In one embodiment, the system 10 may further include an exhaust gas recirculation (EGR) conduit 44 fluidly coupled between the exhaust gas conduit 32 and the air intake conduit 20. In this embodiment, an EGR valve 46 is disposed in-line with the EGR conduit 44, and may be controlled in a conventional manner to control the flow of exhaust gas from the exhaust gas conduit 32 to the intake manifold 14 of the engine 12. Optionally, an EGR cooler 48 may be disposed in-line with the EGR conduit 44, between the EGR valve 46 and the intake air conduit 20, to cool the exhaust gas flowing through the EGR conduit 44 prior to introducing the recirculated exhaust gas into the air intake conduit 20. The control concepts described herein are also applicable to non-EGR engines, and the EGR components 44, 46, and 48 are accordingly shown in phantom in FIG. 1 to indicate that these components may or may not be included.

Also shown in phantom in FIG. 1 is a conventional intake air throttle 50 disposed in-line with the intake air conduit 20, which may, but need not, be included in the system 10. In embodiments that include the EGR components 44, 46 and 48, the intake air throttle 50 is located upstream of the junction of the EGR conduit 44 and the intake air conduit 20. The intake air throttle 50 may be controlled in a conventional manner to actively control the flow of fresh air into the intake manifold 14.

Also shown in phantom in FIG. 1 is a variable geometry turbocharger (VGT) mechanism 84 which may, be need not, be included in the system 10. In embodiments that include the VGT mechanism 84, it is configured to selectively control the swallowing capacity and/or efficiency of the turbine 26 and thereby control the flow rate of exhaust gas through the exhaust conduits 32 and 34 as well as the rotational speed of the turbine 26 and compressor 16. Such a VGT mechanism 84 may be or include a conventional variable geometry mechanism and actuator associated with the turbine 26 that is controllable in a conventional manner to correspondingly vary the swallowing capacity of the turbine 26. Alternatively or additionally, the VGT mechanism 80 may be or include a conventional exhaust throttle that is controllable in a conventional manner to correspondingly control the efficiency of the turbine 26 by controlling the flow rate of exhaust gas through the exhaust gas conduits 32 and 34. It will be appreciated that the VGT mechanism 84 may alternatively or additionally be or include other conventional mechanisms for controlling the swallowing capacity and/or efficiency of the turbine 24 including, but not limited to, a conventional wastegate fluidly coupled between the exhaust gas conduits 32 and 34, or the like.

The system 10 further includes a control circuit 52 configured to control the overall operation of the engine 12 as well as any associated air handling components, such as an EGR valve 46, an air intake throttle 50 and a VGT mechanism 84, if any one or combination of such components is included in the system 10. In one embodiment, the control circuit 52 is a microprocessor-based control circuit typically referred to as an electronic or engine control module (ECM), or electronic or engine control unit (ECU). It will be understood, however, that the control circuit 52 may generally be or include one or more general purpose or application specific control circuits arranged and operable as will be described hereinafter. The control circuit 52 includes, or is coupled to, a memory unit 55.

The control circuit 52 includes a number of inputs receiving signals, commands, and/or values corresponding to various operating conditions of the engine 12 and/or values relating to operation of the aftertreatment component 38. For example, an engine speed sensor 60 is electrically connected to an engine speed input (ES) of the control circuit 52 via a signal path 62. In one embodiment, the engine speed sensor 60 is a conventional Hall-effect sensor producing a signal on signal path 62 that is indicative of engine speed and crank angle relative to a reference crank angle; e.g., top-dead-center (TDC). Alternatively, any conventional sensor may be used; e.g., variable reluctance sensor or the like, that is operable to produce a signal on signal path 62 that corresponds to the rotational speed of the engine 12. In such embodiments, however, another sensor or technique will typically be required to determine engine position in the form of a crank angle relative to a reference crank angle.

The system 10 further includes a mass air flow sensor 64 positioned in fluid communication with the air intake conduit 20 and electrically coupled to a mass airflow input, MAF, of the control circuit 52 via a signal path 66. In embodiments that do not include the EGR components 44, 46, and 48, the mass airflow sensor 64 may be positioned anywhere along the air intake conduit 20 or in fluid communication with the intake manifold 14. In embodiments that do include the EGR components 44, 46, and optionally 48, the mass airflow sensor 64 is positioned upstream of the junction of the EGR conduit 44 and the air intake conduit 20 as illustrated in FIG. 1. In either case, the mass airflow sensor 64 is a conventional sensor operable to produce a fresh mass airflow signal on signal path 66 that corresponds to the flow rate of fresh air through the intake air conduit 20.

The system 10 further includes an oxygen (also sometimes referred to as a lambda) sensor 68 in fluid communication with the exhaust gas conduit 34 between the OC 36 and the exhaust gas aftertreatment component 38. The oxygen sensor 68 may be of conventional construction, and is electrically connected to an exhaust oxygen input, EO2, of the control circuit 52 via a signal path 70. The oxygen sensor 68 is configured to produce a signal on the signal path 70 that corresponds to the oxygen concentration in the exhaust gas entering the exhaust gas aftertreatment component 38.

A conventional fuel system 72 is coupled to the engine 12, and is electrically connected to the control circuit 52 by a number, J, of signal paths 74, wherein J may be any positive integer. The control circuit 52 includes conventional fueling logic which is responsive to a number of engine operating conditions to determine appropriate fueling commands in a conventional manner. The control circuit 52 provides the fueling commands (FC) to the fuel system 72 via the number, J, of signal paths 74 to thereby control the fuel system 72 in a conventional manner to supply fuel to the engine 12.

In embodiments of the system 10 that include the EGR conduit 44 and EGR valve 46, the system 10 further includes a conventional EGR valve actuator 76 operatively coupled to the EGR valve 46 and electrically connected to an EGR valve output, EGRV, of the control circuit 52 via a signal path 78. The EGR valve actuator 76 is responsive to an EGR valve control signal produced by the control circuit 52 on the signal path 78 to control the position of the EGR valve 46 relative to a reference position.

In embodiments of the system 10 that include an intake air throttle 64, the system 10 further includes a conventional intake air throttle actuator 80 operatively coupled to the intake air throttle 64 and electrically connected to an intake air throttle output, IAT, of the control circuit 52 via a signal path 82. The intake air throttle actuator 80 is responsive to an intake air throttle control signal produced by the control circuit 52 on the signal path 82 to control the position of the intake air throttle relative to a reference position.

In embodiments of the system 10 that include the VGT mechanism 84, the VGT mechanism 84 is electrically connected to a variable geometry turbocharger control output, VGT, of the control circuit 40. The VGT mechanism 84 is responsive to a VGT control signal produced by the control circuit 52 to control the position or setting of the VGT mechanism 84 relative to a reference position or setting in a conventional manner.

Figure 2:
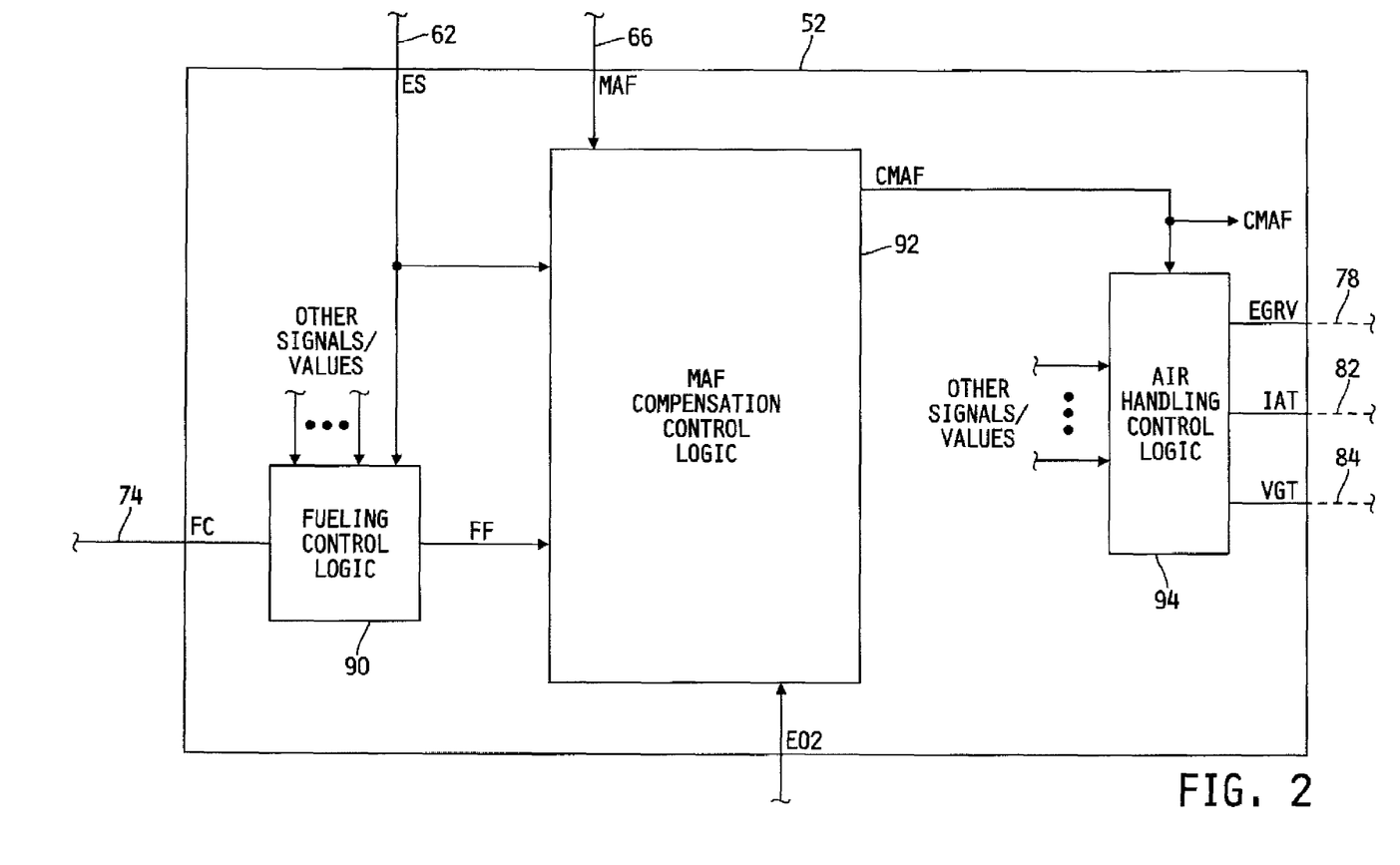
FIG. 2 is a block diagram of one illustrative embodiment of some of the internal logic blocks of the control circuit of FIG. 1 as they relate to this disclosure.

As described hereinabove, the control circuit 52 includes, or is coupled to, a memory unit 55. The memory unit 55 has stored therein a number of software algorithms executable by the control circuit 52 to control various operations of the engine 12 and associated air handling components in embodiments wherein the system 10 includes any such air handling components, e.g., one or any combination of the EGR valve 46, the intake air throttle 64 and the VGT mechanism 84. A number of control structures defined by one or more such software algorithms stored in the memory 55 of the control circuit 52 are illustrated in FIG. 2. One such control structure is a fueling control logic structure 90 that is responsive to a number of engine operating conditions, such as engine speed, ES, and a number of other operating signals and/or values, to determine appropriate fueling commands in a conventional manner. The fueling commands, FC, produced by the fueling control logic structure 90 include a fuel flow rate (FF) component, typically in units of mm$^3$/stroke, which corresponds to a flow rate of fuel supplied by the fuel system 72 to the engine 12.

Another control structure defined by the one or more software algorithms stored in the memory 55 of the control circuit 52 is a mass air flow (MAF) compensation control logic structure 92 receiving as inputs the engine speed signal, ES, the mass air flow signal, MAF, the exhaust oxygen signal, EO2, and the fuel flow rate value, FF, determined by the fueling control logic structure 90 and provided to the MAF compensation control logic structure 92 by the fueling control logic structure 90. The MAF compensation control logic structure 92 is operable, as will be described in detail hereinafter, to process the foregoing input signals and values and produce a compensated mass air flow value, CMAF as a function of the various input signals.

Yet another control structure defined by the one or more software algorithms stored in the memory 55 of the control circuit 52 is an air handling control logic structure 94 receiving as inputs the compensated mass air flow value, CMAF, as well as a number of additional operating and/or control signals and/or values. The air handling control logic structure 94 is responsive to the various input signals and/or values to determine appropriate EGR valve position control commands, intake air throttle control commands, and/or appropriate VGT mechanism control commands, in a conventional manner, as a function of the various input signals and values, depending upon which, if any, of the corresponding air handling components are included in the system 10. The air handling control logic structure 94 is operable to process the one or more control commands in a conventional manner and produce corresponding EGR valve position control signals, EGRV, intake air throttle control signals, IAT, and/or VGT mechanism control signals, VGT. In addition to the air handling control logic structure 94, the compensated mass air flow value, CMAF, is provided externally to one or more other control structures (not shown) defined by the one or more algorithms stored in the memory 55 of the control circuit 52, as illustrated in FIG. 2. The one or more other control structures may include conventional control structures that would otherwise require the fresh mass air flow value as an input, and that in the embodiment illustrated in FIG. 2 instead receive the compensated mass air flow value, CMAF.

Figure 3:
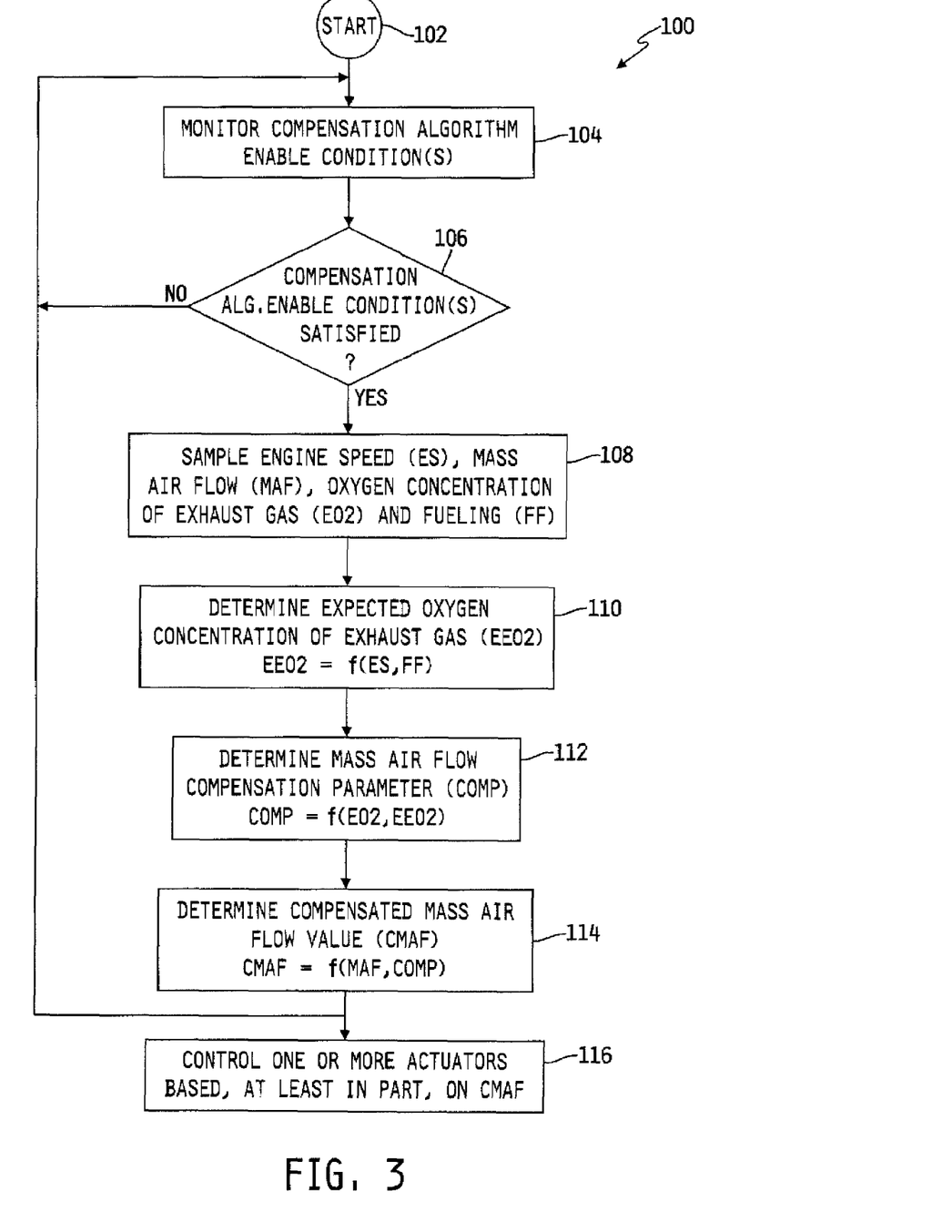
FIG. 3 is a flowchart of one illustrative embodiment of a software algorithm included in the mass air flow compensation control logic block of FIG. 2.

Referring now to FIG. 3, a flowchart of one illustrative embodiment of a software algorithm 100 for compensating a mass air flow signal is shown. The software algorithm 100 can be stored in the memory unit 55 in the form of instructions that are executable by the control circuit 52 to produce a compensated mass air flow signal. The algorithm begins at step 102, and thereafter at step 104 the control circuit 52 is operable to monitor a number of compensation algorithm enable condition(s), i.e., one or more engine and/or aftertreatment system operating conditions that must be met in order to continue with the mass air flow signal compensation algorithm 100. Examples of compensation algorithm enable conditions may include, but are not limited to the engine 12 operating at steady state, not undergoing regeneration of the particulate filter 42, not undergoing SOx (Sulfur oxides) regeneration of the NOx adsorber catalyst 40, not undergoing NOx regeneration of the NOx catalyst 40, and not post-injecting fuel into the exhaust gas stream to keep either of the NOx adsorber catalyst or the particulate filter 42 at an elevated temperature. Those skilled in the art will recognize alternative and/or additional compensation algorithm enable conditions, and any such compensation algorithm enable conditions are contemplated by this disclosure. In any case, execution of the algorithm 100 advances from step 104 to step 106 where the control circuit 52 is operable to determine whether all of the compensation algorithm enable conditions that were monitored at step 104 are satisfied. If not, the control circuit 52 is operable to loop back to step 104. If, at step 106, the control circuit 52 determines that all of the compensation algorithm enable conditions monitored at step 104 are satisfied, algorithm execution advances to step 108.

At step 108, the control circuit 52 is operable to sample the engine speed signal, ES, produced by the engine speed sensor 60 on the signal path 62 and to sample the mass air flow signal, MAF, produced by the mass air flow sensor 64 on the signal path 66. The control circuit 52 is also operable at step 108 to sample the oxygen concentration, EO2, by sampling the oxygen concentration signal produced by the oxygen sensor 68 on the signal path 70. The control circuit 52 is further operable at step 108 to sample the fuel flow rate, FF, corresponding to the instantaneous rate of fuel delivered by the fuel system 72 to the engine 12, by monitoring the fuel command signals produced by the control circuit 52 on the signal paths 74 or other related fueling signals or values internal to the control circuit 52.

Following step 108, the control circuit 52 is operable at step 110 to determine an expected oxygen concentration, EEO2, of the exhaust gas produced by the engine 12, corresponding to an estimated oxygen concentration in the exhaust gas based on other engine operating parameters. In the illustrated embodiment, for example, the control circuit 52 is operable at step 110 to compute the expected oxygen concentration, EEO2, as a function of the engine speed and fuel flow rate determined at step 1108, or EEO2=f(ES, FF). In one embodiment, the memory unit 55 may, for example, have a two-dimensional exhaust oxygen estimation table stored therein having one table axis defined by discrete values of engine speed, ES, and another table axis defined by discrete values fuel flow rate, FF, and which is populated by corresponding values of estimated oxygen concentration of the exhaust gas produced by the engine 12. In this embodiment, the control circuit 52 is operable at step 110 to map the instantaneous engine speed and fuel flow rates determined at step 108 values to a corresponding estimated oxygen concentration of the exhaust gas produced by the engine 12 using the exhaust oxygen estimation table just described. Those skilled in the art will recognize other conventional structures and/or techniques for estimating the oxygen concentration of exhaust gas produced by the engine 12, and such other conventional structures and/or techniques are contemplated by this disclosure.

Following step 110, the control circuit 52 is operable at step 112 to determine a mass air flow compensation parameter, COMP, as a function of the oxygen concentration value, EO2, sampled at step 108 from the oxygen concentration signal produced by the oxygen sensor 68, and also of the estimated oxygen concentration value, EEO2, determined at step 112, or COMP=f(EO2, EEO2). In one embodiment, for example, this function is a ratio such that COMP=EEO2/EO2. Those skilled in the art will, however, recognize other functions for determining COMP that may include weighting values, or the like, and any such other functions are contemplated by this disclosure.

Following step 112, the control circuit 52 is operable at step 114 to determine a compensated mass air flow value, CMAF, as a function of the mass air flow value sampled from the mass air flow sensor 64 and the compensation value, COMP, determined at step 112, or CMAF=f(MAF, COMP). Execution of the algorithm 100 loops back from step 11 to step 104 to repeat the mass air flow signal compensation algorithm 100. Execution of the algorithm 100 also advances from step 114 to step 116 where the compensated mass air flow value, CMAF, is provided to the air handling control logic 94 of FIG. 2, wherein the air handling control logic 94 is operable to control one or more of the air handling actuators described hereinabove, e.g., EGR valve 46, intake air throttle 50 and/or VGT 84, based, at least in part, on CMAF. The compensated mass air flow value, CMAF, is also made available at step 116 to one or more other software algorithms being executed by the control circuit 52 in lieu of the mass air flow value determined strictly from the mass air flow signal produced by the mass air flow sensor 64, wherein one or more such software algorithms may be executed by the control circuit 52 to control operation of the engine 12.

Figure 4:
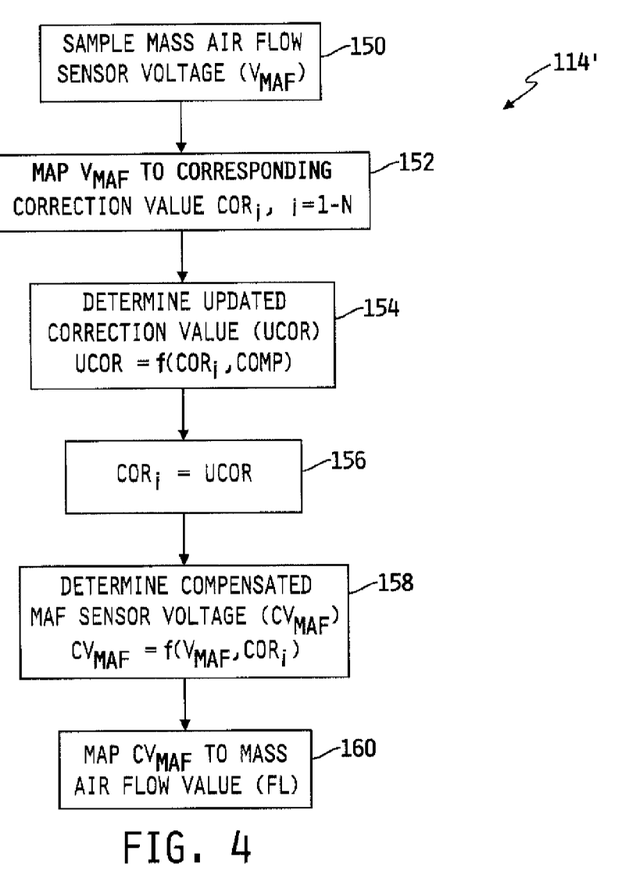
FIG. 4 is a flowchart of one illustrative embodiment of a software routine for carrying out the compensated mass air flow value determination step of the algorithm of FIG. 3.
Figure 5:
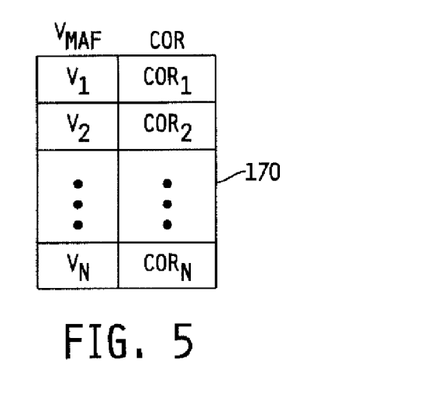
FIG. 5 is an example table that is illustratively accessed and maintained by the software routine of FIG. 4.

Referring now to FIG. 4, a flowchart of one illustrative embodiment of a software routine 114' for executing step 114 of the algorithm 100 of FIG. 3 is shown. The software routine 114' can be stored in the memory unit 55 in the form of instructions that are executable by the control circuit 52 to determine the compensated mass air flow value, CMAF. The routine 114' begins at step 150 where the control circuit 52 is operable to sample the voltage, $V_{MAF}$, produced by the mass air flow sensor 64. Thereafter at step 152, the control circuit 52 is operable to map the sensor voltage, $V_{MAF}$, to a corresponding correction value, $COR_i$, using, for example, an N-size correction table, and one example of such an N-size correction table 170 is illustrated in FIG. 5. In the correction table 170 of FIG. 5, one column is populated with "N" discrete values, $V_1$-$V_N$, of the voltage, $V_{MAF}$, produced by the mass air flow sensor 64, wherein "N" may be any positive integer and may be chosen to establish any desired amount or degree of resolution of the resulting compensated mass air flow signal, CMAF. A second column of the N-size correction table 170 is populated with "N" correction values, COR, each associated with a corresponding discrete $V_{MAF}$ value. The control circuit 52 is operable at step 152 to map the sampled mass air flow sensor voltage, $V_{MAF}$, to a corresponding correction value, $COR_i$, where i=1-N. Thus, for example, if the sampled mass air flow sensor voltage, $V_{MAF}$, corresponds to $V_2$, the correction table 170 will produce $COR_2$ as the correction value.

Following step 152, the routine 114' advances to step 154 where the control circuit 52 is operable to determine an updated correction value, UCOR, as a function of the correction value, $COR_i$, determined at step 152 and the compensation value, COMP, determined at step 112 of the algorithm 100 of FIG. 3. In one embodiment, for example, the initial values of all $COR_{i, i=1-N}$, are set to one, and UCOR=$COR_i$+COMP. In this embodiment, product of $V_{MAF}$ and UCOR corresponds to the value of $V_{MAF}$ that would have to be produced by the mass air flow sensor 64 to result in an exhaust gas concentration value of EEO2. However, to avoid over-correction and excessive switching of CMAF, it is desirable to add only a fraction of COMP to the existing correction value, $COR_i$. In one embodiment, for example, this fraction may be 10% so that UCOR=$COR_i$+COMP/10, although it will be understood that other fractional values of COMP are contemplated by this disclosure. In any case, the control circuit 52 is operable at the following step 156 to set the current correction value, $COR_i$=UCOR. The correction values, $COR_i$, are therefore updated from their initial values by adding fractional portions of the COMP value thereto, and over time the correction values, $COR_i$, will converge to appropriate values for correcting each of the corresponding mass air flow sensor voltage values.

Figure 6:
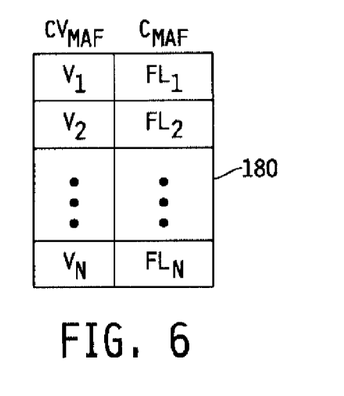
FIG. 6 is another example table that is illustratively accessed by the software routine of FIG. 4.

Following step 156, the control circuit 52 is operable at step 158 to determine a compensated mass air flow sensor voltage, $CV_{MAF}$, as a function of the corresponding voltage, $V_{MAF}$, produced by the mass air flow sensor 64 and the corresponding correction value, $COR_i$, computed at steps 152-156, or $CV_{MAF}$=f($V_{MAF}$, $COR_i$). In the above example embodiment, this function is a product so that $CV_{MAF}$=$V_{MAF}$+$COR_i$. Thereafter at step 160, the control circuit 52 is operable to map the compensated mass air flow sensor voltage, $CV_{MAF}$, to a corresponding compensated mass air flow value, CMAF, using conventional signal conversion techniques. In the illustrated embodiment, for example, the control circuit 52 may be operable to execute step 160 using a two-column, N-size flow conversion table 180 of the type illustrated in FIG. 6. In the flow conversion table 180 of FIG. 6, a compensated mass air flow sensor voltage column, $CV_{MAF}$, is populated with "N" discrete values, $V_1$-$V_N$, of the compensated mass air flow sensor voltages, and a compensated mass flow rate column, CMAF, is populated with "N" corresponding discrete mass flow rate values, $FL_1$-$FL_N$. The control circuit 52 is thus operable at step 160 to map the compensated mass flow rate sensor voltages, $CV_{MAF}$, to corresponding compensated mass flow rate values, CMAF, using a flow rate conversion table of the type illustrated in FIG. 6.

Figure 7:
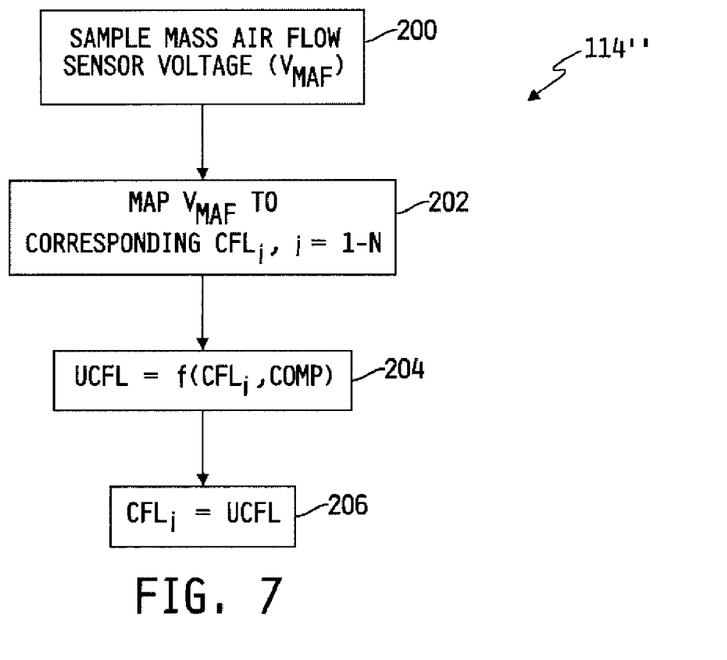
FIG. 7 is a flowchart of one illustrative embodiment of an alternate software routine for carrying out the compensated mass air flow value determination step of the algorithm of FIG. 3.
Figure 8:
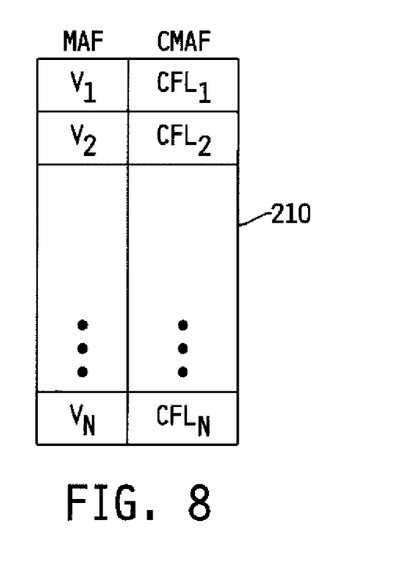
FIG. 8 is an example table that is illustratively accessed and maintained by the software routine of FIG. 7.

Referring now to FIG. 7, a flowchart of another illustrative embodiment of a software routine 114" for executing step 114 of the algorithm 100 of FIG. 3 is shown. The software routine 114" can be stored in the memory unit 55 in the form of instructions that are executable by the control circuit 52 to determine the compensated mass air flow value, CMAF. The routine 114" begins at step 200 where the control circuit 52 is operable to sample the voltage, $V_{MAF}$, produced by the mass air flow sensor 64. Thereafter at step 202, the control circuit 52 is operable to map the sensor voltage, $V_{MAF}$, directly to a compensated mass air flow value. In one embodiment, for example, an N-size compensation table 210 of the type illustrated in FIG. 8 may be used by the control circuit 52 to execute step 202 of the routine 114". In the compensation table 210 of FIG. 8, one column is populated with "N" discrete values, $V_1$-$V_N$, of the voltage, $V_{MAF}$, produced by the mass air flow sensor 64, wherein "N" may be any positive integer and may be chosen to establish any desired amount or degree of resolution of the resulting compensated mass air flow signal, CMAF. A second column of the N-size correction table 170 is populated with "N" corresponding corrected flow values, $CFL_1$-$CFL_N$, of the compensated mass air flow signal, CMAF. The control circuit 52 is operable at step 202 to map the sampled mass air flow sensor voltage, $V_1$-$V_N$, directly to a corresponding compensated mass air flow value, $CFL_1$-$CFL_N$.

Following step 202, the routine 114" advances to step 204 where the control circuit 52 is operable to determine an updated corrected flow value, UCFL, as a function of the compensated mass air flow value, $CFL_i$, determined at step 202 and the compensation value, COMP, determined at step 112 of the algorithm 100 of FIG. 3. In one embodiment, for example, the initial values of all $CFL_{i, i=1-N}$, are set to default mass air flow values resulting from a conventional mapping of mass air flow sensor voltages to corresponding mass air flow values, e.g., by using a table of the type illustrated in FIG. 6 or other conventional conversion technique, and $UCFL=CFL_i+COMP*FRAC$. In this embodiment, as with the embodiment described with respect to FIGS. 4-6, it is desirable to add only a fraction of COMP to the existing compensated flow values, $CFL_i$, to avoid over-correction and excessive switching of CMAF. In one embodiment, for example, this fraction may be 10% so that $UCFL=CFL_i+COMP/10$, although it will be understood that other fractional values of COMP are contemplated by this disclosure. In any case, the control circuit 52 is operable at the following step 206 to set the current compensated flow value, $CFL_i$=UCFL. The compensated mass air flow values, $CFL_i$, are therefore updated from their initial, default values by adding fractional portions of the COMP value thereto, and over time the compensated mass air flow values, $CFL_i$, will converge to the appropriate compensated mass air flow values.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A mass air flow sensor signal compensation system comprising:
   an engine speed sensor configured to produce an engine speed signal indicative of rotational speed of an internal combustion engine,
   an oxygen sensor configured to produce an oxygen signal indicative of oxygen concentration of exhaust gas produced by the engine,
   a mass air flow sensor configured to produce a mass air flow signal indicative of a flow rate of fresh air into the engine, and
   a control circuit including a memory having stored therein instructions that are executable by the control circuit to determine an expected oxygen concentration of the exhaust gas as a function of the engine speed signal and a fuel flow value corresponding to a rate of fuel supplied to a fueling system of the engine, to determine a compensation parameter as a function of the expected oxygen concentration and the oxygen signal and to determine a compensated mass air flow value as a function of the mass air flow signal and the compensation parameter.

2. The system of claim 1 further comprising at least one actuator responsive to an actuator control signal to control operation of at least one of the engine and an air handling system coupled to the engine,
   wherein the control circuit is configured to produce the at least one actuator control signal based at least in part on the compensated mass air flow value.

3. The system of claim 1 wherein the instructions further comprise instructions that are executable by the control circuit to determine the compensated mass air flow value by mapping an instantaneous value of the mass air flow signal to a corresponding correction value, updating the correction value as a function of the correction value and the compensation parameter, determining a compensated mass air flow signal based on the mass air flow signal and the updated correction value and mapping the compensated air flow signal to the compensated mass air flow value.

4. The system of claim 3 wherein the instructions further comprise instructions that are executable by the control circuit to update the correction value by modifying the correction value by a fraction of the compensation parameter.

5. The system of claim 3 wherein the instructions further comprise instructions that are executable by the control circuit to store the updated correction value in a map that maps the instantaneous value of the mass air flow signal to the corresponding correction value.

6. The system of claim 5 further comprising at least one actuator responsive to an actuator control signal to control operation of at least one of the engine and an air handling system coupled to the engine,
   wherein the control circuit is configured to produce the at least one actuator control signal based at least in part on the compensated mass air flow value.

7. The system of claim 1 wherein the instructions further comprise instructions that are executable by the control circuit to determine the compensated mass air flow value by mapping an instantaneous value of the mass air flow signal to a corresponding compensated mass air flow value and updating the corresponding compensated mass air flow value as a function of the corresponding compensated mass air flow value and the compensation parameter.

8. The system of claim 7 wherein the instructions further comprise instructions that are executable by the control circuit to update the corresponding compensated mass air flow value by modifying the corresponding compensated mass air flow value by a fraction of the compensation parameter.

9. The system of claim 7 wherein the instructions further comprise instructions that are executable by the control circuit to store the updated corresponding compensated mass air flow value in a map that maps the instantaneous value of the mass air flow signal to the corresponding compensated mass air flow value.

10. The system of claim 9 further comprising at least one actuator responsive to an actuator control signal to control operation of at least one of the engine and an air handling system coupled to the engine,
    wherein the control circuit is configured to produce the at least one actuator control signal based at least in part on the compensated mass air flow value.

11. A method of compensating a mass air flow signal produced by a mass air flow sensor in fluid communication with an air intake passageway of an internal combustion engine, the method comprising:

monitoring an oxygen signal produced by an oxygen sensor and indicative of an oxygen content of exhaust gas produced by the engine, determining an expected oxygen concentration of exhaust gas produced by the engine, determining a compensation parameter as a function as a function of the oxygen signal and the expected oxygen concentration, and determining a compensated mass air flow value as a function of the mass air flow signal and the compensation parameter.

12. The method of claim 11 further comprising controlling an actuator that controls operation of at least one of the engine and an air handling system coupled to the engine as a function of the compensated mass air flow value.

13. The method of claim 11 wherein determining the compensated mass air flow value comprises:

mapping an instantaneous value of the mass air flow signal to a corresponding correction value, updating the correction value as a function of the correction value and the compensation parameter, determining a compensated mass air flow signal based on the mass air flow signal and the updated correction value, and mapping the compensated air flow signal to the compensated mass air flow value.

14. The method of claim 13 wherein updating the correction value comprises modifying the correction value by a fraction of the compensation parameter.

15. The method of claim 13 further comprising storing the updated correction value in a map that maps the instantaneous value of the mass air flow signal to the corresponding correction value.

16. The method of claim 11 wherein determining the compensated mass air flow value comprises:

mapping an instantaneous value of the mass air flow signal to a corresponding compensated mass air flow value, and updating the corresponding compensated mass air flow value as a function of the corresponding compensated mass air flow value and the compensation parameter.

17. The method of claim 16 wherein updating the corresponding compensated mass air flow value comprises modifying the corresponding compensated mass air flow value by a fraction of the compensation parameter.

18. The method of claim 16 further comprising storing the updated corresponding compensated mass air flow value in a map that maps the instantaneous value of the mass air flow signal to the corresponding compensated mass air flow value.

19. The method of claim 11 wherein determining an expected oxygen concentration of exhaust gas produced by the engine comprises:

monitoring an engine speed signal produced by an engine speed sensor and indicative of rotational speed of the engine, monitoring a rate of fuel supplied a fuel system of the engine, and determining the expected oxygen concentration as a function of instantaneous values of the engine speed signal and the rate of fuel supplied to the engine.

20. A method of compensating a mass air flow signal produced by a mass air flow sensor in fluid communication with an air intake passageway of an internal combustion engine, the method comprising:

monitoring the mass air flow signal produced by the mass air flow sensor, determining an expected oxygen concentration of exhaust gas produced by the engine, determining a compensation parameter as a function of the expected oxygen concentration and a measured value of the oxygen concentration of the exhaust gas, and determining a compensated mass air flow value as a function of the mass air flow signal and the compensation parameter.

21. The method of claim 20 further comprising controlling an actuator that controls operation of at least one of the engine and an air handling system coupled to the engine as a function of the compensated mass air flow value.

22. The method of claim 20 wherein determining the compensated mass air flow value comprises:

mapping an instantaneous value of the mass air flow signal to a corresponding correction value, updating the correction value as a function of the correction value and the compensation parameter, determining a compensated mass air flow signal based on the mass air flow signal and the updated correction value, and mapping the compensated air flow signal to the compensated mass air flow value.

23. The method of claim 20 wherein determining the compensated mass air flow value comprises:

mapping an instantaneous value of the mass air flow signal to a corresponding compensated mass air flow value, and updating the corresponding compensated mass air flow value as a function of the corresponding compensated mass air flow value and the compensation parameter.

24. The method of claim 20 wherein determining the compensation parameter comprises:

monitoring an oxygen signal produced by an oxygen sensor and indicative of the oxygen content of the exhaust gas produced by the engine, and determining the compensation parameter as a function of the expected oxygen concentration and the measured value of the oxygen concentration in the form of an instantaneous value of the oxygen signal.

25. The method of claim 20 wherein determining an expected oxygen concentration of exhaust gas produced by the engine comprises:

monitoring an engine speed signal produced by an engine speed sensor and indicative of rotational speed of the engine, monitoring a rate of fuel supplied a fuel system of the engine, and determining the expected oxygen concentration as a function of instantaneous values of the engine speed signal and the rate of fuel supplied to the engine.

* * * * *